(No Model.)

C. F. A. HINRICHS.
Shaving Tray.

No. 240,710. Patented April 26, 1881.

Witnesses
Chas. H. Smith
J. Hait

Inventor
Charles F. A. Hinrichs.
per Lemuel W. Serrell
atty

UNITED STATES PATENT OFFICE.

CHARLES F. A. HINRICHS, OF BROOKLYN, NEW YORK.

SHAVING-TRAY.

SPECIFICATION forming part of Letters Patent No. 240,710, dated April 26, 1881.

Application filed March 11, 1881. (No model.)

*To all whom it may concern:*

Be it known that I, CHARLES F. A. HINRICHS, of Brooklyn, in the county of Kings and State of New York, have invented an Improvement in Shaving-Trays, of which the following is a specification.

Mugs have been made in which there is a perforated partition for the support of the soap above the water-space in the bottom of the mug. The same, however, is not easily kept clean, and there is no space for the brush except when resting upon the hairs or bristles, in which position the end of the brush becomes crooked and the hairs bent sidewise, so that they are not convenient for use.

My invention relates to an improved tray in which there is space for the soap, a place for the brush to lie flat without the end being in contact with the tray, and a water-space below, the parts being constructed so that they are easily kept clean.

Figure 2:
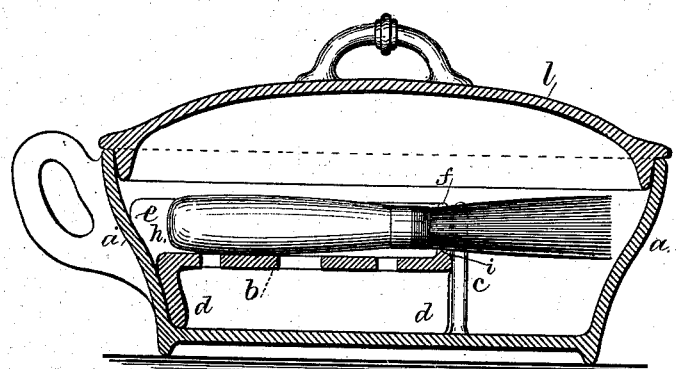
Figure 1:
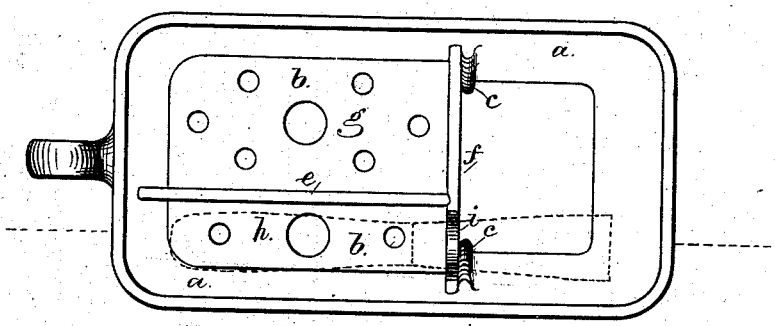

In the drawings, Figure 1 is a plan of the tray without the cover. Fig. 2 is a vertical section of the tray and cover.

The dish $a$ is of porcelain or similar material, and is preferably of an oblong shape, somewhat similar to an ordinary soap-dish, and within this is a perforated tray, $b$, that is not as long as the interior of the dish $a$, and it is retained in position by ribs $c\ c$, so that there is a space between the end of the tray and the inner end of the dish $a$, and this tray is raised upon feet or flanges $d$, so that there is a space in the bottom of the tray for water. There are partitions $e$ and $f$ upon the tray to separate the soap-space $g$ from the brush-space $h$, and a handle may be added to the dish, if desired; and the cover $l$ is preferable for inclosing the dish.

It will be seen that when not in use the brush will lie horizontally between the partition $e$ and side of the dish, and the hairs or bristles are not bent by contact with the dish, the partition $f$ being made with a semicircular notch at $i$ for the brush to lie in.

The soap is retained within its space $g$, and, resting upon the perforated tray, it does not remain wet, and there is ample space below the tray for the water required in shaving, and the parts can be separated for washing or cleaning the dish when desired, thus rendering the shaving-tray a convenient and cleanly article adapted to soap, brush, and water.

I claim as my invention—

1. The dish $a$, tray $b$, partitions $e$ and $f$, forming receptacles for soap and brush, and a water-space below the tray, the tray being shorter than the dish, so as to give access to the water-space, as set forth.

2. The removable perforated tray having partitions $e\ f$, for retaining the soap and the brush, and supporting legs or flanges, in combination with the dish $a$, having ribs $c$, for retaining the tray in place, substantially as set forth.

Signed by me this 7th day of March, A. D. 1881.

C. F. A. HINRICHS.

Witnesses:
GEO. T. PINCKNEY,
WILLIAM G. MOTT.